April 20, 1943.  W. G. BRUCE  2,316,932
DUSTER FOR INSECTICIDES
Filed Sept. 14, 1942  2 Sheets-Sheet 1

INVENTOR
W. G. BRUCE
BY
ATTORNEYS

April 20, 1943.    W. G. BRUCE    2,316,932
DUSTER FOR INSECTICIDES
Filed Sept. 14, 1942    2 Sheets-Sheet 2

INVENTOR
W. G. BRUCE
BY
ATTORNEYS

Patented Apr. 20, 1943

2,316,932

UNITED STATES PATENT OFFICE 2,316,932

DUSTER FOR INSECTICIDES

Wesley Gordon Bruce, Dallas, Tex., dedicated to the free use of the People in the Territory of the United States Application September 14, 1942, Serial No. 458,326

2 Claims. (Cl. 119—159)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to a mechanical dusting apparatus and it is more particularly concerned with a device for the automatic application of insecticidal dusts to livestock, such as cattle and horses, for the control of external parasites.

An object of this invention is to provide a suitable structure which is inexpensive to manufacture and install and which will evenly distribute a predetermined amount of insecticidal dust over the backs of animals.

Other objects of this invention are to provide a simple and efficient means of controlling certain external parasites of livestock; to provide a labor-saving device for the application of insecticidal dusts; and, in general, to provide a device which is adaptable to most farm, dairy, and ranch conditions and which may be so located that the animals to be treated must pass through it on their way to and from a barn, corral, feed yard, etc.

The following description, considered together with the accompanying drawings, will disclose this invention more fully. Its construction, arrangement and combination of parts are set forth in the following description:

Figure 1:
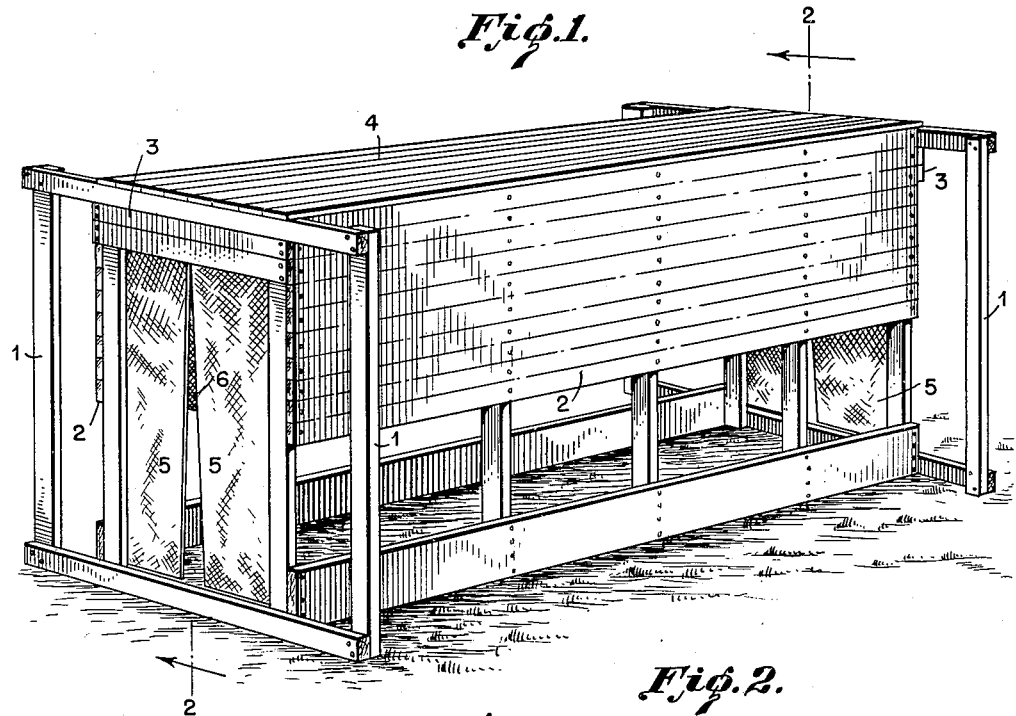
Figure 1 is a perspective view of a housing for enclosing a dusting device.
Figure 2:
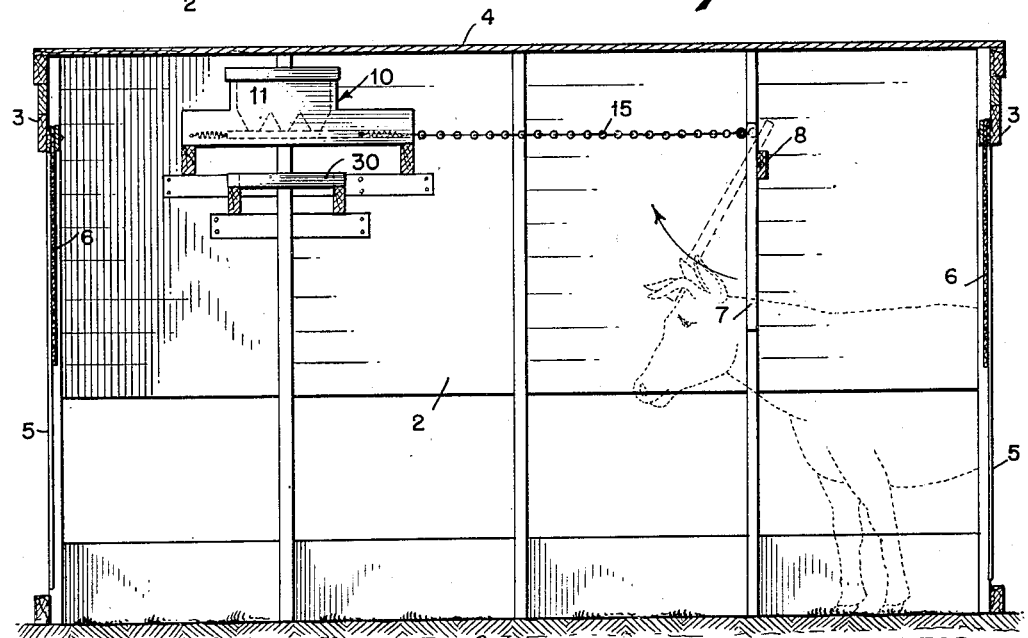
Figure 2 is a longitudinal section of the housing on the line 2—2 of Figure 1, the dusting device being shown in elevation.

Referring more particularly to the drawings in which like numerals designate like parts, the device illustrated comprises a frame 1, side walls 2, end walls 3 and a roof 4, forming a passageway of sufficient size to permit livestock to pass through it in single file from one end to the other. A set of long drape curtains 5—5 is suspended from the ceiling at each end of the passageway. In addition to the above mentioned curtains, a short curtain 6 is suspended near each set of long curtains. The short curtain on the exit is of heavy coarse material for purposes later described. The passageway is thus essentially closed to the wind. A flap 7, mounted on a rigid frame 8, is pivotly attached to the sides of the housing. A dusting device 10 is installed near the ceiling and at one end of the housing.

Figure 3:
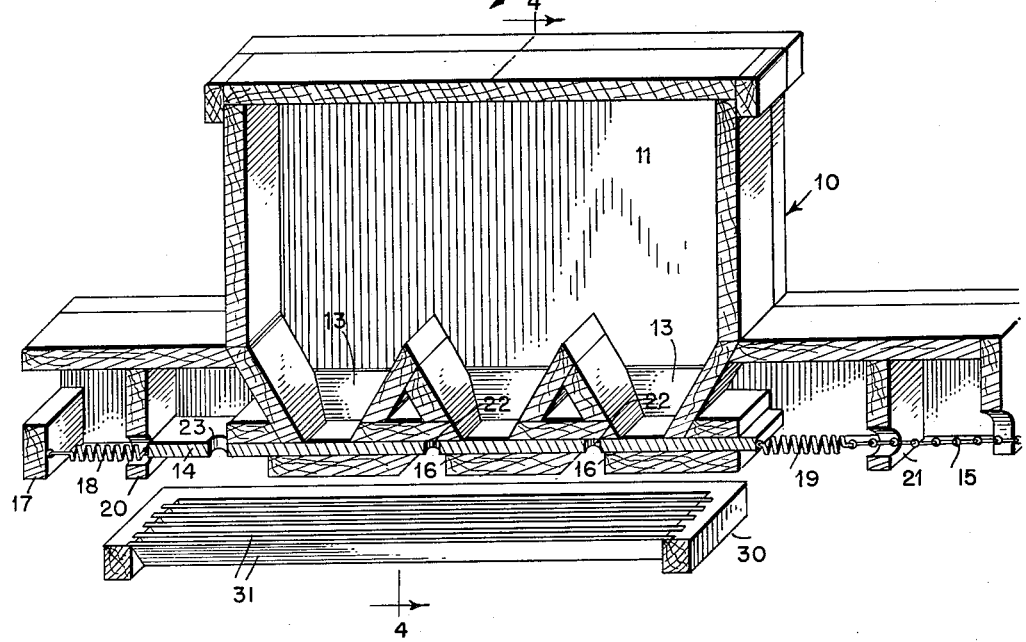
Figure 3 is a longitudinal section of the dusting device and Figure 4 is a cross section of the dusting device on line 4—4 of Figure 3.
Figure 4:
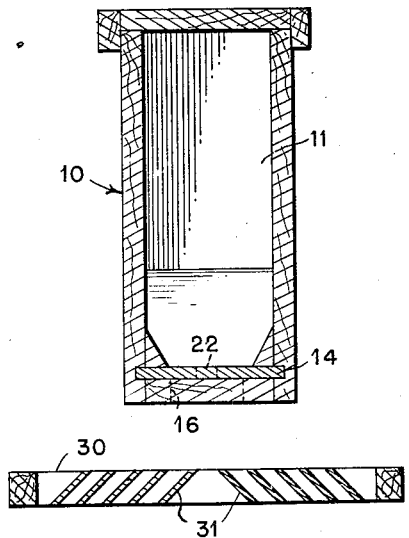

The dusting device is illustrated in detail in Figures 3 and 4. It comprises a hopper 11 for insecticidal dusts below which a spreader 30 is located. The spreader comprises a number of narrow strips 31, set at angles as shown in Figure 4. The hopper 11 has outlets 13 in its bottom wall. A sliding dispenser 14, which is operated by a pull member or chain 15 attached to one end of the flap 7, is located under the outlets. The floor located under the dispenser has passages 16 misaligned with the outlets of the hopper, as shown. The sliding dispenser is attached at one end to a fixed bracket 17 by means of a spring 18 and at its other end to the pull member 15 by means of a spring 19. Fixed stops 20 and 21 limit movement of the dispenser in either direction. The dispenser is provided with some trapping cavities 22 which in one position of the dispenser will match with some of the outlets 13 and in another position with passages 16. It is also provided with another trapping cavity 23 which at a position of the dispenser different than that first mentioned above will match with an outlet 13.

The device operates as follows:

Animals to be dusted enter at one end in single file. As they proceed through the passage-way they encounter flap 7 which is pushed forward and which in turn pulls chain 15. This moves the sliding dispenser 14 to a position wherein trapping cavities 22 match outlets 13 and are filled with insecticidal dust from hopper 11. A small animal will push flap 7 forward only far enough to fill trapping cavities 22. A larger animal will push flap 7 far enough forward to also fill trapping cavity 23. The sliding dispenser can move only to stop 21, spring 19 taking care of additional pull on chain 15. As the animal passes through the passage-way flap 7 drags along its back and finally drops to the original position, whereupon the dispenser is snapped back against stop 20 by spring 18. This releases the dust over the spreader 20 through which the dust falls and is distributed evenly over the back of the animal. The short curtain at the exit of the passage-way, being of a heavy coarse material, drags over the back of the animal and brushes the dust into its hair.

The amount of insecticidal dust dispensed can be regulated by varying the size and number of the trapping cavities in the sliding dispenser.

Experiments have shown that a light application of insecticidal dust to the backs of cattle at regular intervals is effective in killing cattle grubs. The dusting means herein described will automatically and effectively distribute insecticidal dust on the backs of cattle. Such dusting may also be effective in controlling or at least reducing infections of lice, flies and other insects.

Having thus described my invention, I claim:

1. A device for dusting powdered material on livestock comprising a hopper having a plurality of outlets in its bottom wall, a sliding dispenser located beneath the bottom wall and having a plurality of trapping cavities, some of which will align with some of the outlets in a first position of the dispenser and others of which will align with others of the outlets in a second position, all of said cavities being misaligned with said outlets in a third position which is such as to discharge the dusting material, and means for operating said sliding dispenser so arranged that it may operate the dispenser to either the first position or to both the first and second positions and then to the third position, whereby different quantities of dusting material are discharged for the two operating positions described, said last mentioned means comprising a pull member attached to one end of the dispenser, a spring attaching the other end of the dispenser to a fixed member and stops for limiting the movement of the dispenser in either direction.

2. A device for dusting powdered material on livestock comprising a hopper having a plurality of outlets in its bottom wall, a sliding dispenser located beneath the bottom wall and having a plurality of trapping cavities, some of which will align with some of the outlets in a first position of the dispenser and others of which will align with others of the outlets in a second position, all of said cavities being misaligned with said outlets in a third position which is such as to discharge the dusting material, and means for operating said sliding dispenser so arranged that it may operate the dispenser to either the first position or to both the first and second positions and then to the third position, whereby different quantities of dusting material are discharged for the two operating positions described, said last mentioned means comprising a pull member attached to one end of the dispenser, a spring attaching the other end of the dispenser to a fixed member, stops limiting the movement of the dispenser in either direction and a device operable by animals to be dusted connected to the pull member, the parts being so arranged that a small sized animal will operate the dispenser to the first mentioned position only and then to the third position and a larger sized animal will operate it to both the first and second positions and then to the third mentioned position.

WESLEY GORDON BRUCE.